(12) United States Patent
Shimada

(10) Patent No.: US 8,249,107 B2
(45) Date of Patent: Aug. 21, 2012

(54) METHOD AND APPARATUS FOR FRAME RELAY

(75) Inventor: Nagao Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 12/379,816

(22) Filed: Mar. 2, 2009

(65) Prior Publication Data

US 2009/0296738 A1    Dec. 3, 2009

(30) Foreign Application Priority Data

May 30, 2008    (JP) ................................ 2008-143283

(51) Int. Cl.
  *H04J 3/16*    (2006.01)
(52) U.S. Cl. ....................................... 370/474
(58) Field of Classification Search ............... 370/464, 370/465, 468, 470, 471, 474, 477, 480, 498, 370/545
  See application file for complete search history.

(56) References Cited

U.S. PATENT DOCUMENTS

| | | | | |
|---|---|---|---|---|
| 6,574,226 B1* | 6/2003 | Nakano et al. | ........... | 370/395.64 |
| 6,603,767 B1* | 8/2003 | Murakami et al. | ........ | 370/395.64 |
| 2002/0186660 A1* | 12/2002 | Bahadiroglu | ................ | 370/248 |
| 2003/0026292 A1* | 2/2003 | Abrol et al. | .................... | 370/470 |
| 2005/0117577 A1* | 6/2005 | Fichou et al. | ................. | 370/389 |
| 2008/0205314 A1* | 8/2008 | Pecen | ........................... | 370/310 |
| 2008/0209068 A1* | 8/2008 | Herzog et al. | ................ | 709/232 |

FOREIGN PATENT DOCUMENTS

| | | |
|---|---|---|
| JP | 2007-329606 A | 12/2007 |
| WO | 02/45308 A1 | 6/2002 |
| WO | 02/097476 A2 | 12/2002 |

OTHER PUBLICATIONS

Japanese Office Action mailed Apr. 3, 2012 for corresponding Japanese Application No. 2008-143283, with Partial English-language Translation.

* cited by examiner

*Primary Examiner* — Kwang B Yao
*Assistant Examiner* — Obaidul Huq
(74) *Attorney, Agent, or Firm* — Fujitsu Patent Center

(57) ABSTRACT

In a frame relay apparatus or a frame relay method, in order to be able to transfer data between channels having different maximum transfer units, payloads are fragmentized or combined and assembled into a frame, in response to the maximum transfer units of the channels. Fragmentized payloads are associated with the original data. By doing so, especially the number of frames in a channel with a large maximum transfer unit is controlled, and the transfer efficiency of frames of the entire network may be improved.

8 Claims, 15 Drawing Sheets

3031 (management memory table)

IP stream information

Transferring information

| No. | Sender IP address | Destination IP address | ID | MF | Count value |
|---|---|---|---|---|---|
| 1 | 192.168.0.10 | 192.168.0.11 | 100 | 0 | 0 |
| 2 | 192.168.0.10 | 192.168.0.11 | 100 | 0 | 0 |
| 3 | 192.168.0.10 | 192.168.0.11 | 100 | 0 | 0 |
| 4 | ⋮ | ⋮ | ⋮ | ⋮ | ⋮ |

| | When Receiving Frames (S21) | When Transmitting the Original Frames (S26) |
|---|---|---|
| | f11: L2 header(18) \| L3 header(20) \| P1 \| P2 \| P3 \| P4 \| P5 \| FCS \| Add FCS; MF=1, Fragment offset=0 (0 byte) | f1: L2 header(18) \| L3 header(20) \| P1 \| FCS(4); 1480; MF=1, Fragment offset=0 |
| | | f2: L2 header(18) \| L3 header(20) \| P2 \| FCS(4); 1480; MF=1, Fragment offset=185 (1480 bytes) |
| | | f3: L2 header(18) \| L3 header(20) \| P3 \| FCS(4); 1480; MF=1, Fragment offset=370 (2960 bytes) |
| | | f4: L2 header(18) \| L3 header(20) \| P4 \| FCS(4); 1480; MF=1, Fragment offset=555 (4440 bytes) |
| | | f5: L2 header(18) \| L3 header(20) \| P5 \| FCS(4); 1480; MF=1, Fragment offset=740 (5920 bytes) |
| | f12: h61 \| h62 \| P6 \| P7 \| Pay-load \| Pay-load \| FCS \| Add FCS; MF=0, Fragment offset=925 (7400 bytes) | f6: L2 header(18) \| L3 header(20) \| P6 \| FCS(4); 1480; MF=1, Fragment offset=925 (7400 bytes) |
| | | f7: L2 header(18) \| L3 header(20) \| P7 \| FCS(4); 1480; MF=0, Fragment offset=1100 (8880 bytes) |

Fig. 13

METHOD AND APPARATUS FOR FRAME RELAY

CROSS-REFERENCE TO RELATED APPLICATIONS

This application is based upon and claims the benefit of priority of the prior Japanese Patent Application No. 2008-143283, filed on May 30, 2008, the entire content of which are incorporated herein by reference.

FIELD

This invention relates to a frame relay apparatus and a frame relay method.

BACKGROUND

Recently, the transferring efficiency of data is improved by various methods, with scale expansion, the diversification and the greater complexity of channels. Under such circumstances, with a conventional system like the one disclosed in International Publication Pamphlet No. WO2002/097476, in an optical network, downstream and upstream data are transmitted in variable-length packets utilizing time division multiplexing with variable-length time slots. The length of the variable-length time slots changes in response to the upstream traffic demand.

However, with a conventional system using the variable-length time slots, it is not possible to communicate by frames, such as in Ethernet (registered trademark) and the like, and the transferring efficiency of frames could not be improved. It is desirable to improve the transferring efficiency of frames, especially for Ethernet (registered trademark), the most widely used communication system of LAN (Local Area Network).

SUMMARY

According to an aspect of the invention, an apparatus includes: a receiver for receiving a plurality of frames via a first channel; a determiner for determining whether or not each of the received frames includes a payload that is set by fragmentizing the original data; a payload extractor for extracting each of the payloads from each of frames to associate with the original data, if the determiner determines that the frames include the payloads; a frame assembler for assembling one frame by combining each of the extracted payloads, for every corresponding original data, so as to fulfill the maximum transfer unit of a second channel, the maximum transfer unit being greater than that of the first channel; and a transmitter for transmitting the assembled frame to the second channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Referring now to the attached drawings which form a part of this original disclosure:

FIG. 4 is a diagram illustrating an example of the configuration of a management memory table included in the data manager in FIG. 2;

FIG. 7 is a diagram for describing the way that a frame is assembled;

FIG. 13 is a diagram for describing the way that frames are restored;

DESCRIPTION OF EMBODIMENT(S)

Figure 1:
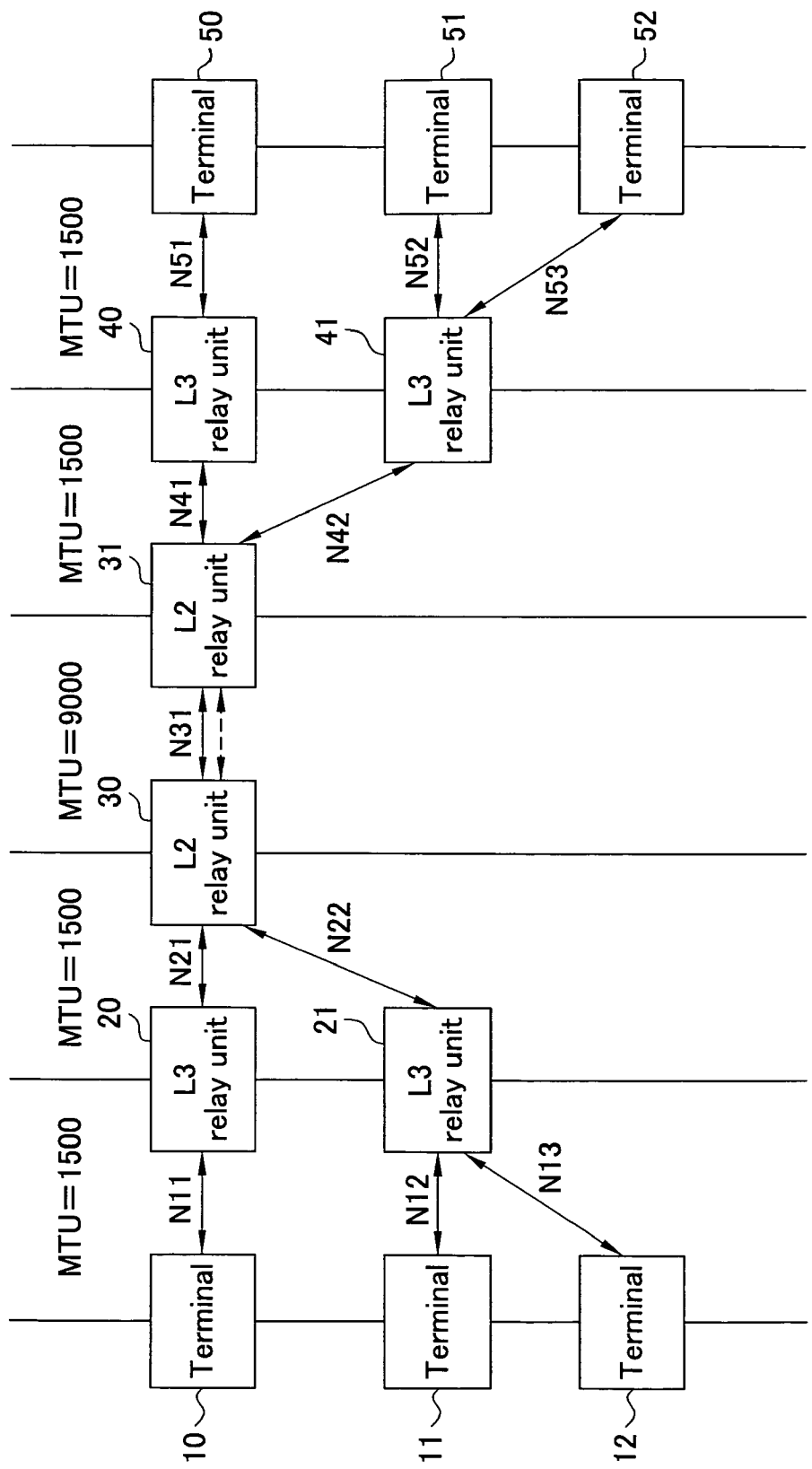
FIG. 1 is a diagram illustrating an example of the configuration of the entire system that includes L2 relay units in embodiment 1 of the present invention.

Embodiments 1 and 2 will be described below while referring to the drawings.

[Embodiment 1]

FIG. 1 is a diagram illustrating an example of the overall configuration of a system including L2 relay units in the embodiment 1.

In FIG. 1, a terminal 10 that belongs to a network (channel, or link) N11 is connected to a network N21 via an L3 (layer 3) relay unit 20. In addition, a terminal 11 that belongs to a network N12 and a terminal 12 that belongs to a network N13 are connected to a network N22 via an L3 relay unit 21. Even though each network in this embodiment is a LAN, they could be other network specifications, such as wireless LANs, and the like.

An L2 (layer 2) relay unit 30 is connected to two networks N21 and N22, and the L2 relay unit 30 is connected to an L2 relay unit 31 via a network N31. The network N31 is configured so that a channel (communication path) of a monitoring frame (hereinafter, referred to as in-channel monitoring frame) may be established (wavy line in FIG. 1).

The L2 relay unit 31 is connected to an L3 relay unit 40 that belongs to a network N41 and an L3 relay unit 41 that belongs to a network N42. The L3 relay unit 40 is connected to a terminal 50 that belongs to a network N51, and the L3 relay unit 41 is connected to a terminal 51 that belongs to a network N52 and a terminal 52 that belongs to a network N53.

Each terminal is a information device, such as a personal computer, a notebook computer, a cellular phone, and the like. Each of the L3 relay units 20, 21, 40, and 41 is a router, for instance, but they may be other L3 devices. Although each of the L2 relay units 30 and 31 is a LAN (Local Area Network) switch, they may be other L2 devices.

Each network in this embodiment is compliant with MAC (Media Access Control) Ethernet (registered trademark) of the IEEE 802.3 standard, for instance, and communications protocol of TCP/IP (Transmission Control Protocol/Internet Protocol) is used. However, communications protocol, such as standards of DIX and the like, UDP/IP (User Datagram protocol), and the like may be applied.

The MTU (Maximum Transfer Unit) of the network N31 is 9000 bytes, and the MTU of the other networks is 1500 bytes, but these values may be changed. Each of the L2 relay units 21, 22, 41, and 42 in this embodiment fragmentizes data in the size of the least MTU (that is, 1500 bytes) of the networks that exist in the path through the path MTU (Path MTU) and transmits the data.

On the other hand, each of the L2 relay units 30 and 31 in this embodiment transmits a single frame that is assembled by combining payload of 1500 bytes to the network N31 having an MTU of 9000 bytes, and transmits a plurality of frames restored by fragmentizing the above described one frame that is combined to each of the networks N21, N22, N41, and N42 having an MTU of 1500 bytes.

Next, the configuration of such L2 relay units will be described. Each of the L2 relay units 30 and 31 of this embodiment performs an assembling process of a frame for assembling one frame with payload of 1500 bytes combined, and a restoring process of frames for restoring a plurality of frames by fragmentizing the above described one frame that is combined. Below, to simplify matters, the configuration of the L2 relay units in the case of performing an assembling process or a restoring process of frames will each be described, and one L2 relay unit is configured to perform the assembling process and the restoring process of frames.

[An Example of the Configuration of an L2 Relay Unit in the Case of Performing an Assembling Process of a Frame]

Figure 2:
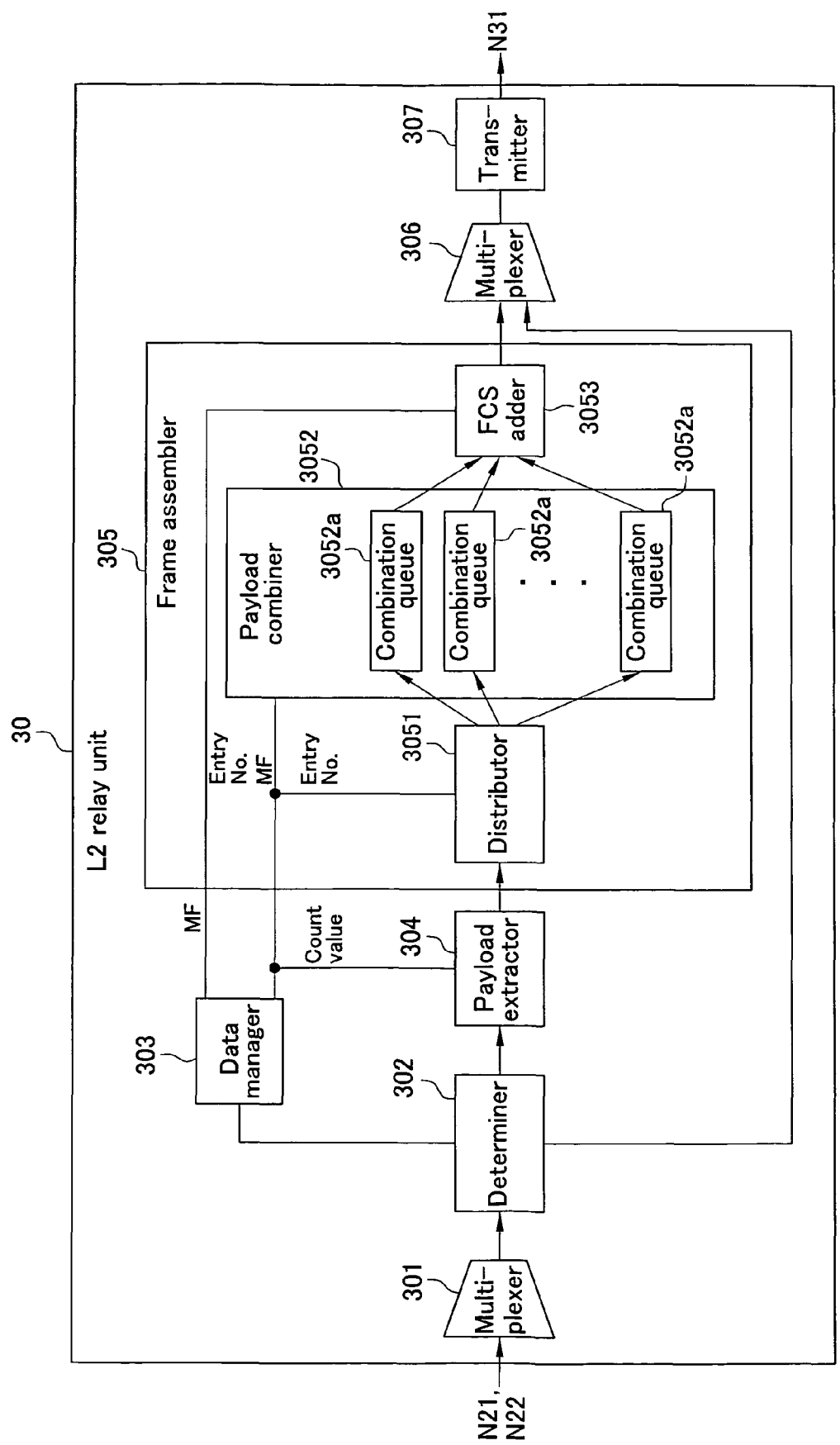
FIG. 2 is a diagram illustrating an example of the configuration of an L2 relay unit in the case of performing an assembling process of a frame.

First, an example of the configuration of the L2 relay unit 30 in the case of performing an assembling process of a frame will be described with reference to FIG. 2. In FIG. 2, the configuration of the L2 relay unit 30 is illustrated. However, the configuration of the L2 relay unit 31 is also the same as that of the L2 relay unit 30.

The L2 relay unit 30 in FIG. 2 is configured to include a multiplexer 301 (first receiver), a determiner 302 (first determiner), a data manager 303, a payload extractor 304, a frame assembler 305, a multiplexer 306, and a transmitter 307 (first transmitter). In this embodiment, even though other than the multiplexer 301 and the transmitter 307, each of the portions of 302, 303, 304, 305, and 306 is described to be configured by hardware (logic circuit), it is not limited to this. Other than the multiplexer 301 and the transmitter 307, each of the portions of 302, 303, 304, 305, and 306 may be, for instance, implemented by a processor executing according to a program that is stored in the memory and read out by the processor.

The multiplexer 301 receives a plurality of frames via the network N21 or N22, and multiplexes these frames and passes these frames to the determiner 302. The multiplexer 301 in this embodiment, for instance, includes eight ports, and multiplexes frames from each port. In that case, if the transferring speed of each network that belongs to each port is 1 Gbps, the multiplexer 301 is able to multiplex frames at 8 Gbps at the maximum and transmit the frames. In addition, in this embodiment, even though the first receiver is described to be the multiplexer, it may be a port that does not perform multiplexing.

Here, an example of the format of a frame received at the multiplexer 301 will be described with reference to FIG. 3.

Figure 3:
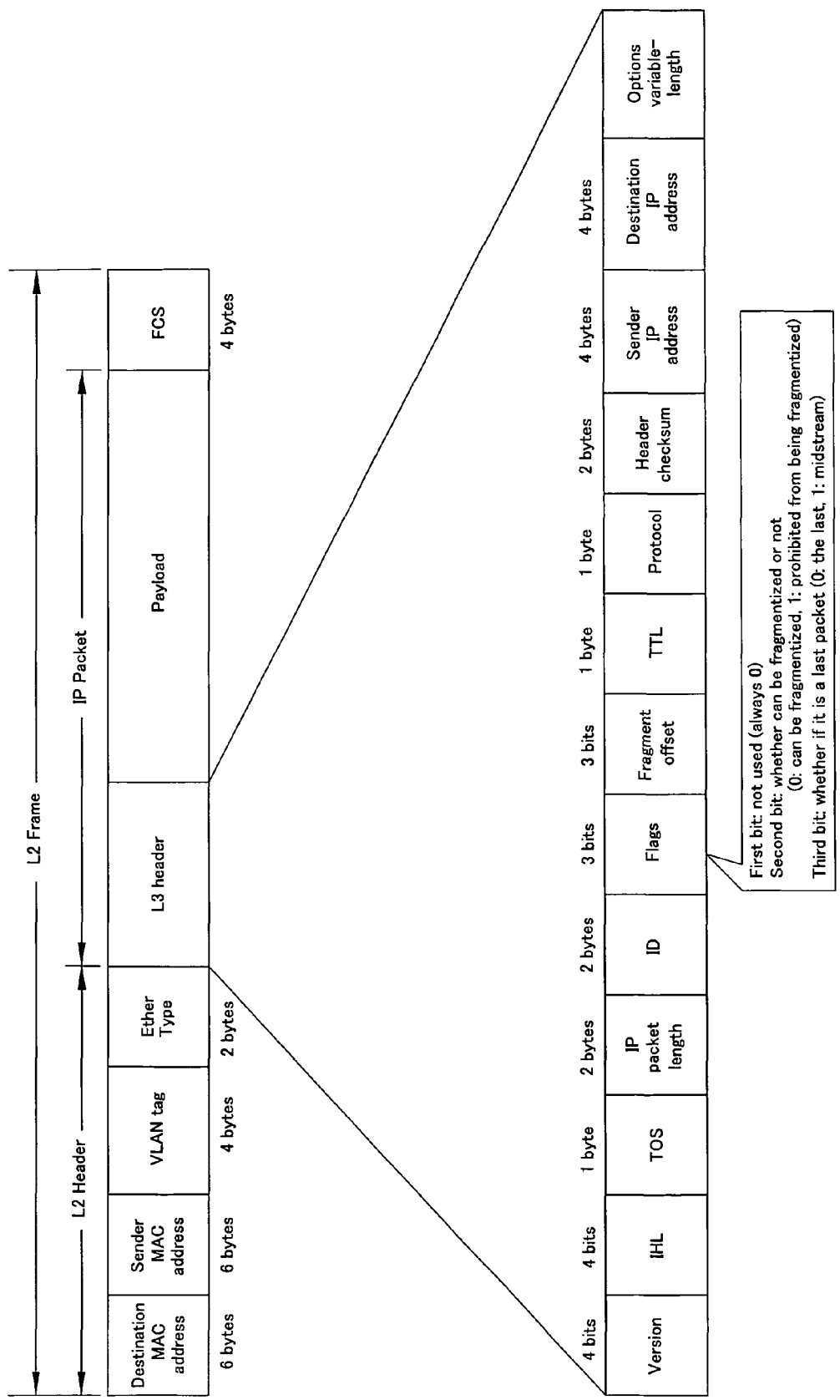
FIG. 3 is a diagram illustrating an example of the format of a frame.

The L2 frame illustrated in FIG. 3 is a frame complying with the IEEE 802.3 standard, and is configured to include an L2 header (frame header), an IP packet, and an FCS (Frame Check Sequence). The L2 header is configured to include a destination MAC address, a sender MAC address, a VLAN (Virtual LAN) tag, and an EtherType. The VLAN tag includes a TPID (Tag Protocol Identifier), a CFI (Canonical Format Indicator), and a VID (VLAN Identifier). In the case that a predetermined identifier is specified for the VID, the frame becomes an in-channel monitoring frame.

The IP packet is configured to include an L3 header (packet header) and a payload. The L3 header is configured to include the Version indicating the IP version number, an IP packet length, an ID (Identification) used as the identifier for specifying the IP packet, and Flags. Flags include a value for indicating whether or not fragmentation is permitted, and an MF and the like for indicating whether or not a packet is the last packet in the case of a fragmentized packet. If the MF is "1", it indicates that the packet is an IP packet in the midst of the others, and if the MF is "0", it indicates that the packet is the last IP packet. Furthermore, the L3 header includes a sender IP address, a destination IP address, Options, and the like. In addition, in this embodiment, Options are not used.

The payload is something in which the original data (the payload before being fragmentized) is fragmentized into a plurality thereof and is set, in accordance with the MTU of the network. In this embodiment, for instance, the minimum value of the MTU of the networks is 1500 bytes, and therefore, the payload is 1500 bytes at the maximum.

In addition, the multiplexer 301 also receives other frames having a format other than the format illustrated in FIG. 3. Other frames include ARP (Address Resolution Protocol) frames, frames for the path control information of packets, and the like.

Returning to FIG. 2, the determiner 302 receives the frame that is received and multiplexed at the multiplexer 301, and determines whether or not the frame that is received includes a payload. Since if a frame includes a payload, the frame includes a sender IP address, a destination IP address, and an ID, and therefore, the determiner 302 determines that the frame includes a payload if there is a sender IP address, a destination IP address, and an ID.

The determiner 302 passes the sender IP address, the destination IP address, the ID, and the MF (refer to FIG. 3) inside the frame to the data manager 303 if it is determined that the frame includes a payload. In addition, the determiner 302 passes the frame that includes the payload to the payload extractor 304. On the other hand, if it is not determined that the frame includes a payload (such as a frame for ARP), the determiner 302 passes the frame (hereinafter, also referred to as other frames) to the multiplexer 306.

Every time a frame is determined to include a payload at the determiner 302, the data manager 303 refers to this frame (the sender IP address, destination IP address, ID, and MF that are received from the determiner 302), and counts the number of determinations of every original data and manages the count value thereof. In this embodiment, the method for managing the count value of every original data, for example, uses a management memory table that stores the sender IP address, destination IP address, and the ID inside a frame. An example of the configuration of this management memory table is illustrated in FIG. 4.

The management memory table 3031 in FIG. 4 includes entries for storing the entry No. (entry numbers), the sender IP addresses, the destination IP addresses, the IDs, the MFs, and the count values. In addition, in this embodiment, as a matter of convenience, the combination of the sender IP address, destination IP address, and ID is called the transferring information, and the combination of the transferring information and the MF is called the IP stream information.

In the case that the combinations of transferring information are the same, the IP packet group (same ID) including the transferring information are transferred from the same sender (same sender IP address) to the same transferring destination (same destination IP address). Each IP packet in that case includes each payload relating to the same original data. Consequently, in this embodiment, the data manager 303 creates and updates the entries of the management memory table 3031 per identical transferring information (per original data) in order to manage the count value of every original data.

The count value is increased from "0" (the initial value) to "1", in the case that the MF from the determiner 302 is "1" (an IP packet in the midst of the others). In the case that the count value reached 5, the count value is reset to "0" for the next count. The count value is counted for every identical transferring information (original data), and therefore, the count value represents the total number of the same IP packets (in other words, the total number of payloads relating to the same original data).

Returning to FIG. 2, in the case that it is determined by the determiner 302 that the frame includes a payload, the payload extractor 304 extracts the payload from the frame that is determined to include the payload to associate with the original data. In this embodiment, as the method for associating the payload with the original data and extracting the payload, the count value of the management memory table 3031 is being used, for instance.

In that case, first, the payload extractor 304 requests the data manager 303 to search for the corresponding count value, with the transferring information, which is inside the frame that was being determined, as the key. The data manager 303 that received the request reads the count value corresponding to that transferring information from the entries of the management memory table 3031 and passes the count value to the payload extractor 304. The payload extractor 304 that received the count value adds the L2 header and the L3 header of the frame, that was determined, to the payload to be extracted, based on the count value. Through this kind of a configuration, the payload extractor 304 is able to provide the L2 header and the L3 header corresponding to the payload based on the count value corresponding to the original data to which the payload belongs, even if a frame that includes a payload that belongs to a different original data is mixed therein.

The payload extractor 304 in this embodiment extracts the payload with the L2 header and the L3 header added from the determined frame, in the case that the count value of the management memory table 3031 is a set value (for example, N=5n: n=0, 1, 2 . . . ). The payload in that case becomes the first payload of one frame that is assembled at the frame assembler 305. On the other hand, in the case that the count value is a value other than the set value, the payload extractor 304 extracts only the payload from the determined frame. The payload in that case becomes a subsequent payload of the one frame that is assembled at the frame assembler 305. The subsequent payload may be one or may be more than one (a second subsequent payload, third subsequent payload . . . ).

In addition, the payload extractor 304 deletes the FCS from the determined frame, in the case of extracting a first payload and a subsequent payload.

Through this kind of a configuration, since the L2 header and the L3 header are added only to the first payload, there is only one (minimum number) of each of the L2 header and the L3 header inside one frame. Consequently, the number of L2 header and L3 header included in one frame is controlled to a minimum number. In addition, the payload extractor 304 passes the extracted payloads (first payload, subsequent payloads) and the transferring information corresponding to the payloads to the frame assembler 305.

Here, in consideration of the MTU of the networks, the combining number of payloads is determined, and the above described set value is set. In this embodiment, the MTU of each of the networks N21, N22, and N31 is a value (1500, 9000) as illustrated in FIG. 1. Therefore, in the case that a frame is transferred to network N31 from each of the networks N21, N22, the maximum number of payloads that may be combined within one frame that is assembled is 5. Consequently, if the set value is N, N is, for instance, N=5n (multiples of 5: n=0, 1, 2, 3 . . . ), but this may be changed.

The frame assembler 305 combines each of the payloads extracted by the payload extractor 304 so as to fulfill the MTU of the network N31 (which is 9000 bytes), which is the transferring destination, having an MTU greater than that of each of the networks N21 and N22, and assembles each of the payloads into one frame (hereinafter, referred to as a combined frame), for each corresponding transferring information (original data). In this embodiment, the frame assembler 305 is configured to include a distributor 3051, a payload combiner 3052 that has a plurality of combination queues (accumulation portions) 3052a, and an FCS adder (frame constructor) 3053. There are, for example, a number of 256 to 4092 (the maximum number of the entry No. of the management memory table 3031) of the plurality of the combination queues 3052a provided.

The distributor 3051 distributes each of the payloads extracted by the payload extractor 304, with each corresponding original data. In this embodiment, as a method for distributing each payload with each original data, the method of distributing each payload for every entry number is used. Since the same transferring information is written in the entries specified by the entry numbers, by distributing payloads for every corresponding entry number, payloads are distributed for each original data.

In that case, first, the distributor 3051 requests the data manager 303 to search for the corresponding entry numbers, with the transferring information corresponding to the extracted payloads as the key. The data manager 303 that received the request reads the entry numbers corresponding to that transferring information from the management memory table 3031, and passes the entry numbers to the distributor 3051. The distributor 3051 that received the entry numbers distributes the payloads to the combination queues 3052a corresponding to the entry numbers. Furthermore, each combination queue 3052a is provided to correspond to each entry number in advance.

The payload combiner 3052 combines each of the distributed payloads. Each of the combination queues 3052a in this embodiment is provided corresponding to the entry numbers, and therefore, each combination queue 3052a accumulates and combines each payload that was distributed at the distributor 3051 for every entry number.

In that case, first, the payload combiner 3052 requests the data manager 303 to search for the corresponding entry numbers and the MF, with the transferring information corresponding to the distributed payloads as the key. The data manager 303 that received the request reads the entry numbers and the MF corresponding to that transferring information from the management memory table 3031 and passes them to the payload combiner 3052. The payload combiner 3052 that received the entry numbers and the MF refers to the received MF, and accumulates and combines the distributed payloads at the combination queues 3052a corresponding to the entry numbers. If the MF is "0" (the last IP packet), the combination queues 3052a, after combining the distributed payloads, pass each of the combined payloads to the FCS adder 3053 (also the same when a certain number of payloads is accumulated). If the MF is "1" (an IP packet in the midst of the others), the combination queues 3052a do not pass the combined payloads to the FCS adder 3053.

The FCS adder 3053 constructs a combined frame that includes each of the combined payloads. In that case, the FCS adder 3053 calculates the header checksum (IP checksum) and the FCS for the combined frame. The FCS adder 3053 then sets each of the calculated values to the appropriate fields (header checksum, FCS) of the combined frame.

In addition, the FCS adder 3053 requests the data manager 303 to search for the MF, with the transferring information corresponding to the last payload of the combined frame as the key, and receives the MF searched from the data manager 303. If the MF is "0" (the last IP packet), the FCS adder 3053 sets the MF inside the combined frame to "0".

When the multiplexer 306 receives the combined frame from the FCS adder 3053, the multiplexer 306 transmits the combined frame to the network N31 from the transmitter 307. In that case, when the multiplexer 306 receives other frames (ARP frame and the like) from the determiner 302, the multiplexer 306 multiplexes (1 Gbps at the maximum) such frame with the combined frame, and transmits it to the network N31 from the transmitter 307.

The transmitter 307 is an output port. The output port in this embodiment has eight ports, and distributes and transmits the frame received from the multiplexer 306 to every destination port. The transferring speed of the frame transmitted is, for example, 1 Gbps.

[Example of the Configuration of the L2 Relay Units in the Case of Performing a Restoring Process of a Frame]

Figure 5:
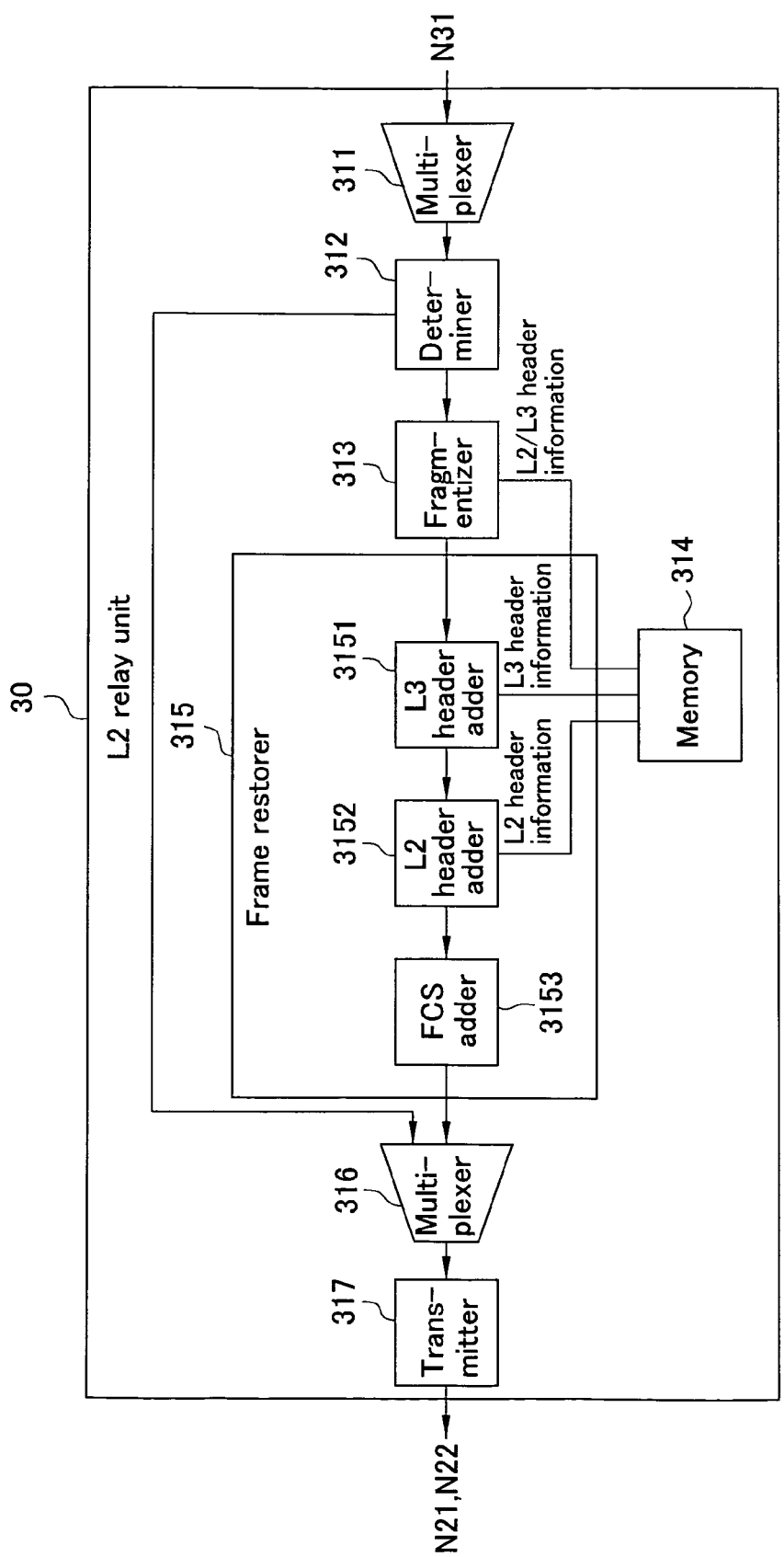
FIG. 5 is a diagram illustrating an example of the configuration of an L2 relay unit in the case of performing a restoring process of frames.

Next, an example of the configuration of the L2 relay unit 30 in the case of performing a restoring process of a frame will be described with reference to FIG. 5. In FIG. 5, even though an example of the configuration of the L2 relay unit 30 is described, the configuration of the L2 relay unit 31 is also the same as that of the L2 relay unit 30.

The L2 relay unit 30 in FIG. 5 is configured to include a multiplexer 311 (second receiver), a determiner 312 (second determiner), a fragmentizer 313, a memory 314, a frame restorer 315, a multiplexer 316, and a transmitter 317 (second transmitter). In this embodiment, other than the multiplexer 311 and the transmitter 317, even though each of the portions of 312, 313, 314, 315, and 316 is described to be configured by hardware (logic circuit), it is not limited to this. Other than the multiplexer 311 and the transmitter 317, each of the portions of 312, 313, 314, 315, and 316 may be, for example, implemented by a processor executing according to a program that is stored in the memory and read out by the processor.

The multiplexer 311 receives a plurality of frames via the network N31, and multiplexes these frames and passes these frames to the determiner 312. The frames received by the multiplexer 311 are combined frames from the L2 relay unit 31, and other frames such as an ARP frame, and the like.

When the determiner 312 receives a frame from the multiplexer 311, the determiner 312 determines whether or not the frame is a combined frame, based on the frame. For example, since the IP packet length is 1500 bytes at the maximum (MTU=1500), the determiner 312 checks whether or not the overall length of the received frame (the length of the entire L2 frame in FIG. 3) is longer than a fixed length (which is 1500 bytes+22 bytes). The 22 bytes is the sum of the lengths of the frame header (which is 18 bytes) and the FCS (which is 4 bytes). If the checked result is that the frame overall length is longer than the fixed length, the determiner 312 determines that the frame is a combined frame, and if not longer than the fixed length, the determiner 312 determines that the frame is a frame of other frames (an ARP frame, and the like) that is other than a combined frame.

The determiner 312 passes the frame to the multiplexer 316 if the determiner 312 determined that the received frame is not a combined frame (a frame for ARP, and the like). If the determiner 312 determined that the received frame is a combined frame, the determiner 312 passes the combined frame to the fragmentizer 313.

The fragmentizer 313 fragmentizes the plurality of payloads included in the frame determined to be a combined frame into individual payloads, if the determiner 312 determined that the frame is a combined frame. Then, based on the L2 header information (frame header information) and the L3 header information (packet header information) of the combined payloads, the fragmentizer 313 sets the L2 header information and the L3 header information corresponding to each fragmentized payload. In that case, the fragmentizer 313 resets only a portion (MF, fragment offset, checksum) of the L3 header information, based on each payload. If the MF inside the combined frame is "0" and a fragmentized payload is positioned to the last of the combined frame, the MF is set to "0", and other than that, the MF is set to "1". The fragment offset is a value which the starting positions of the payloads are sequentially added from "0". The checksum is recalculated.

The fragmentizer 313 then passes the L2 header information and the L3 header information corresponding to each payload to the memory 314. In this embodiment, the fragmentizer 313, memory 314, and the frame restorer 315 are portions that may be in synchronization to perform predetermined processes, sequentially in the fragmentized order of the original data (the first one positioned first in the original data, the second positioned following it . . . ), for each fragmentized payload. This is described below.

The memory 314 receives and sequentially stores the L2 header information and the L3 header information corresponding to each payload from the fragmentizer 313.

Based on the L2 header information and the L3 header information passed sequentially from the memory 314, the frame restorer 315 reconstructs each payload that was fragmentized at the fragmentizer 313 so as to fulfill the MTU of the network N21 or N22, which is the transferring destination having an MTU (which is 1500 bytes) that is less than the network N31, and restores each frame to the frame prior to being combined. In that case, the frame restorer 315 receives the L2 header information and the L3 header information corresponding to each fragmentized payload from the memory 314. The frame restorer 315 then adds each of the received L2 header information and the L3 header information to each fragmentized payload, and restores each frame to the frame prior to being combined (hereinafter, referred to as the original frame).

In this embodiment, the frame restorer 315 is configured to include an L3 header adder 3151, an L2 header adder 3152, and an FCS adder 3153, as illustrated in FIG. 5.

The L3 header adder 3151 receives each fragmentized payload from the fragmentizer 313 and receives the L3 header information corresponding to each payload from the memory 314. The L3 header adder 3151 then adds each of the corresponding L3 header information to each fragmentized payload, and passes each payload to the L2 header adder 3152.

The L2 header adder 3152 receives each payload with the L3 header information added from the L3 header adder 3151, and receives the L2 header information corresponding to each payload from the memory 314. The L2 header adder 3152 then adds each of the corresponding L2 header information to each payload having the L3 header information added, and passes each payload to the FCS adder 3153.

When the FCS adder 3153 receives each payload with the L2 header information and the L3 header information added from the L2 header adder 3152, the FCS adder 3153 calculates the FCS inside each frame including each received payload, and sets the FCS to the FCS field of each frame. The frame with the FCS set is the same as the original frame. The FCS adder 3153 passes the original frame to the multiplexer 316.

When the multiplexer 316 receives the original frame from the FCS adder 3153, the multiplexer 316 transmits the frame to the network N21 or N22 from the transmitter 317. In that case, when the multiplexer 316 receives the other frames (ARP frame, and the like) from the determiner 312, the multiplexer 316 multiplexes (for example, 8 Gbps at the maximum) such frame with an original frame, and transmits it to the network N21 or N22 from the transmitter 317.

The transmitter 317 is an output port. The output port in this embodiment has 8 ports, and distributes and transmits the frames received from the multiplexer 316 to every destination port. The transferring speed of the frames transmitted is, for example, 1 Gbps.

[Assembling Process Procedure of a Frame]

Next, the procedure of an assembling process of a frame in the L2 relay unit 30 will be described with reference to FIGS. 6 to 11.

Figure 6:
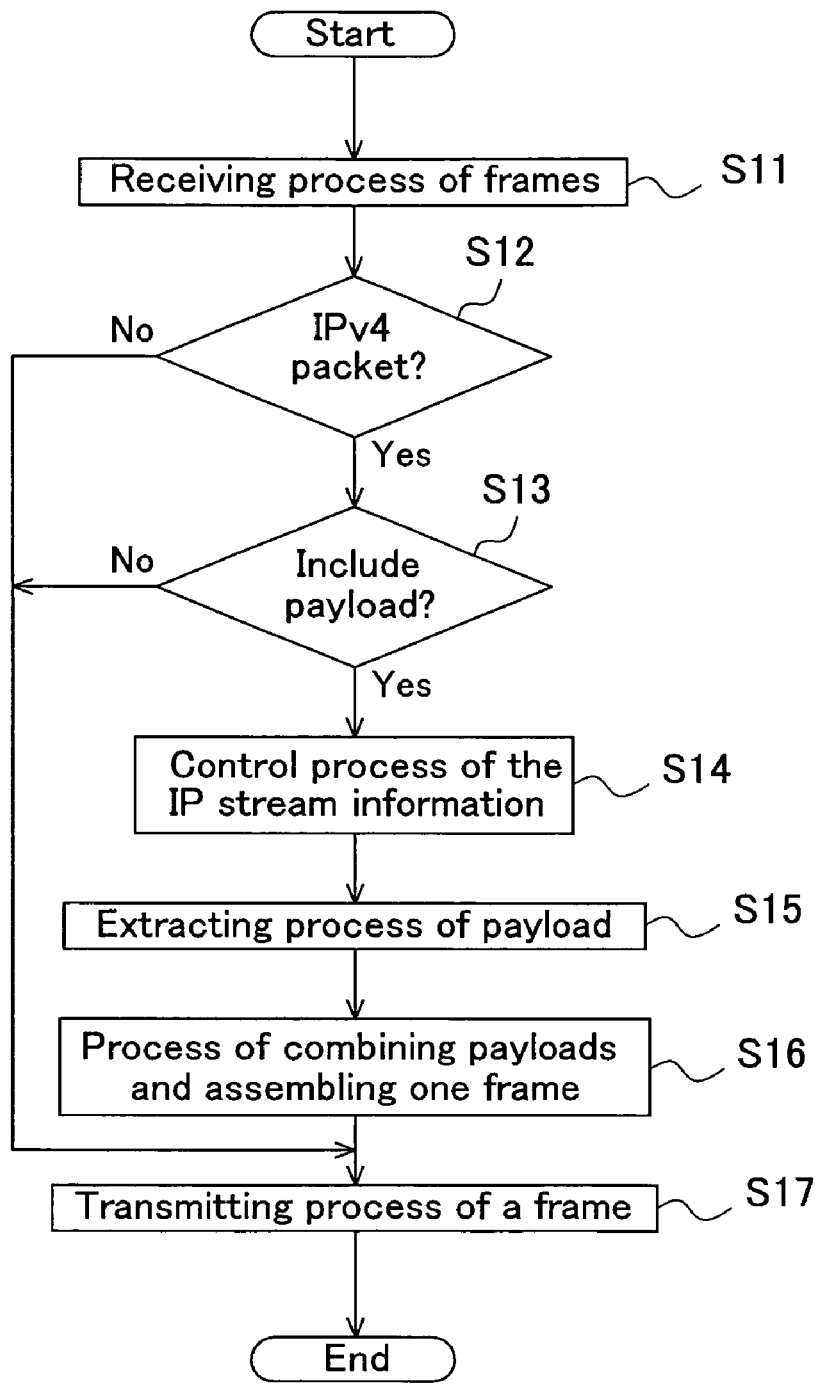
FIG. 6 is a flow chart illustrating the overall assembling process of a frame in the L2 relay unit in FIG. 1.

FIG. 6 is a flow chart illustrating the overall assembling process of a frame in the L2 relay unit. In this embodiment, the L2 relay unit 30 used for performing the assembling process procedure is the one having the configuration illustrated in FIG. 2.

Figure 7:
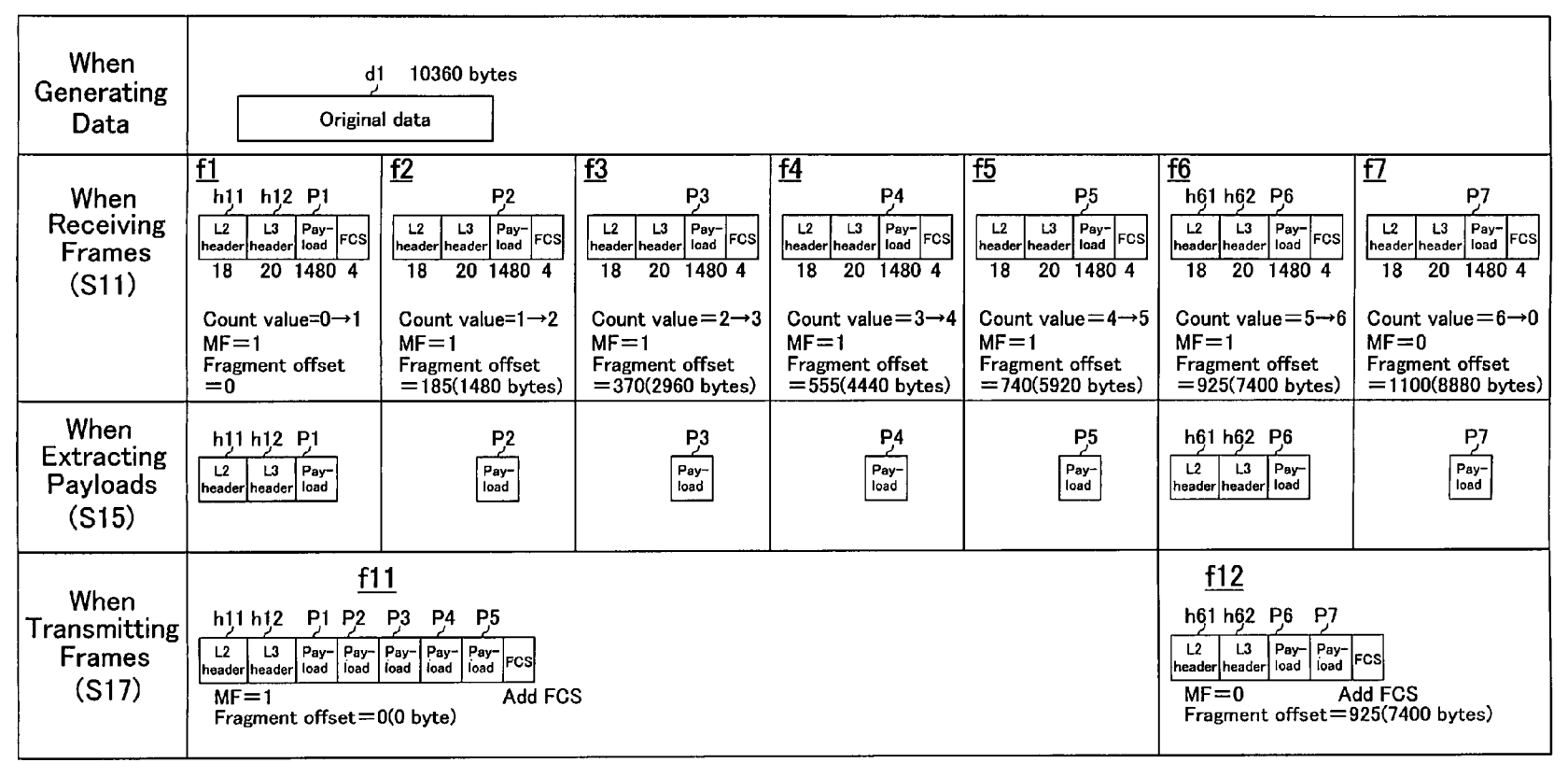

The multiplexer 301 receives frames via the network N21 or N22, and performs a receiving process of frames in which the frames received are multiplexed (Step S11). In this receiving process, the multiplexer 301 receives, for example, seven frames f1, f2, f3, f4, f5, f6, and f7 (which is 1522 bytes/1 frame) illustrated in FIG. 7. Each of the payloads p1 through p7 (which is 1480 bytes) included in each of the frames f1 through f7 is set with the original data d1 (which is 10360 bytes) fragmentized. In FIG. 7, an L2 header h11 (which is 18 bytes) and an L3 header h12 (which is 20 bytes) are added to the frame f1 (same also with the frames f2 to f7). In addition, the original data d1 is, for example, generated at the terminal 10, and terminal 10 is the terminal that sent each of the above described frames f1 through f7 to the terminal 50.

Returning to FIG. 6, next, the determiner 302 determines (Step S12) whether or not the IP packet of the frame is an IPv4 (IP version 4) packet, from the version (refer to FIG. 3) inside the frame with the receiving process performed. If the IP packet is not an IPv4 packet (No in S12), the multiplexer 306 performs a transmitting process of the frame received from the determiner 302 (Step S17).

If the IP packet is an IPv4 packet (Yes in S12), the determiner 302 determines whether or not the frame with the receiving process performed includes a payload (Step S13). If the frame is not a frame including a payload (No in S13), the transmitter 307 performs a transmitting process of the frame received from the determiner 302 via the multiplexer 306 (Step S17). Through the transmitting process, the frame is transmitted to the network N31, which is the transferring destination.

If the frame includes a payload (Yes in S13), the determiner 302 passes the IP stream information inside the frame to the data manager 303, and the data manager 303 that received the IP stream information performs a control process of the IP stream information (Step S14).

Next, when the payload extractor 304 receives the frame from the determiner 302, the payload extractor 304 performs an extracting process (Step S15) for extracting the payload from the frame. In this extracting process, the payload extractor 304 extracts, for instance, payloads p1 through p7, respectively, from each of the frames f1 through f7 illustrated in FIG. 7. The L2 header h11 and the L3 header h12 are added to the payload p1 in that case, and an L2 header h61 and an L3 header h62 are added to the payload p6.

Next, the frame assembler 305 performs a process (Step S16) of combining payloads with extracting process performed at the payload extractor 304 so as to fulfill the MTU of the network N31, which is the transferring destination, and assembling them into a combined frame (one frame), for every corresponding original data. The multiplexer 306 that received the assembled combined frame or other frames (ARP frame, and the like) passes the multiplexed frame to the transmitter 307 and the transmitter 307 performs a transmitting process (Step S17) for transmitting the frame to the network N31. In this transmitting process, the transmitter 307 transmits, for example, two combined frames f11 and f12 as illustrated in FIG. 7.

Through the above kind of an assembling process, one combined frame with a plurality of payloads combined is transmitted to the network N31, which is the transferring destination. Therefore, the number of frames transmitted to the network N31 is controlled to one, and the overall burden on the network N31 is reduced. Consequently, the transferring efficiency of frames on the network N31 is improved.

[Determining Process of a Payload]

Figure 8:
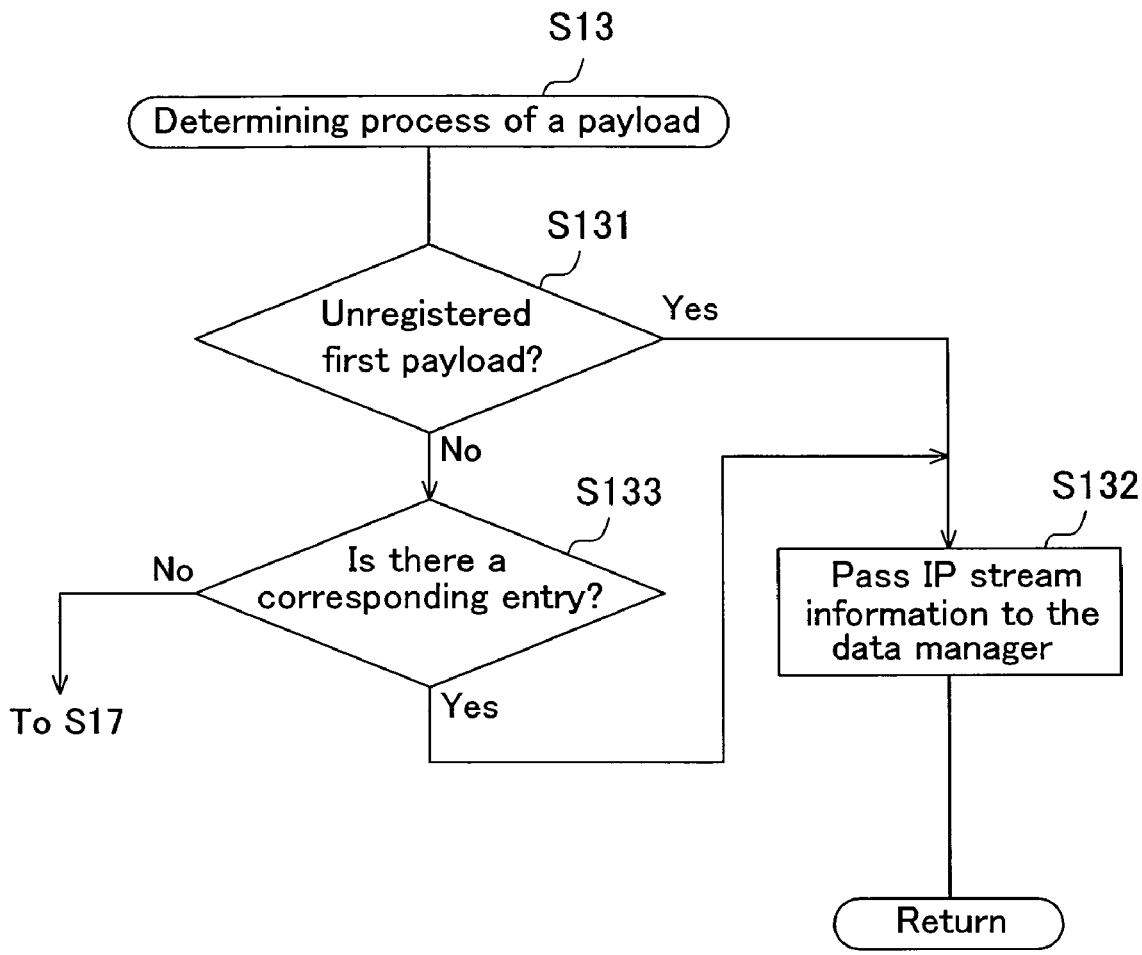
FIG. 8 is a flow chart illustrating the details of the determining process of a payload in FIG. 6.

Next, the determining process of Step S13 in FIG. 6 will be described in detail with reference to FIG. 8.

When at the stage for executing the determining process of Step S13, the determiner 302 first determines (Step S131) whether or not the payload included in the frame is an unregistered first payload, based on the fragment offset and the MF inside the frame containing the transferring information. The determiner 302 checks the fragment offset and the MF values, since the fragment offset and the MF inside the corresponding frame both indicate "0", if the payload is an unregistered first payload.

If the payload is an unregistered first payload (Yes in S131), the determiner 302 passes the IP stream information inside the corresponding frame to the data manager 303 (Step S132), and if the payload is not an unregistered first payload (No in S131), the determiner 302 proceeds to Step S133.

In Step S133, the determiner 302 checks whether if there is a corresponding entry in the management memory table 3031.

In this embodiment, the following kind of a method is used as the method for checking whether if the entry exists. That is, first, the determiner 302 inquires the data manager 303 about whether if the entry exists in the management memory table 3031, with the transferring information inside the received frame as the key. The data manager 303 that received the inquiry checks whether if the entry exists in the management memory table 3031 that stores the transferring information, and replies to the determiner 302 with an answer (for example, a value that indicates whether if the entry exists). The determiner 302 that received the response confirms whether if the entry exists from the answer from the data manager 303.

If the entry exists (Yes in S133), the determiner 302 passes the IP stream information inside the received frame to the data manager 303 (Step S132). If the entry does not exist (No in S133), the step proceeds to Step S17 (transmitting process of a frame) in FIG. 6.

[Control Process of the IP Stream Information]

Figure 9:
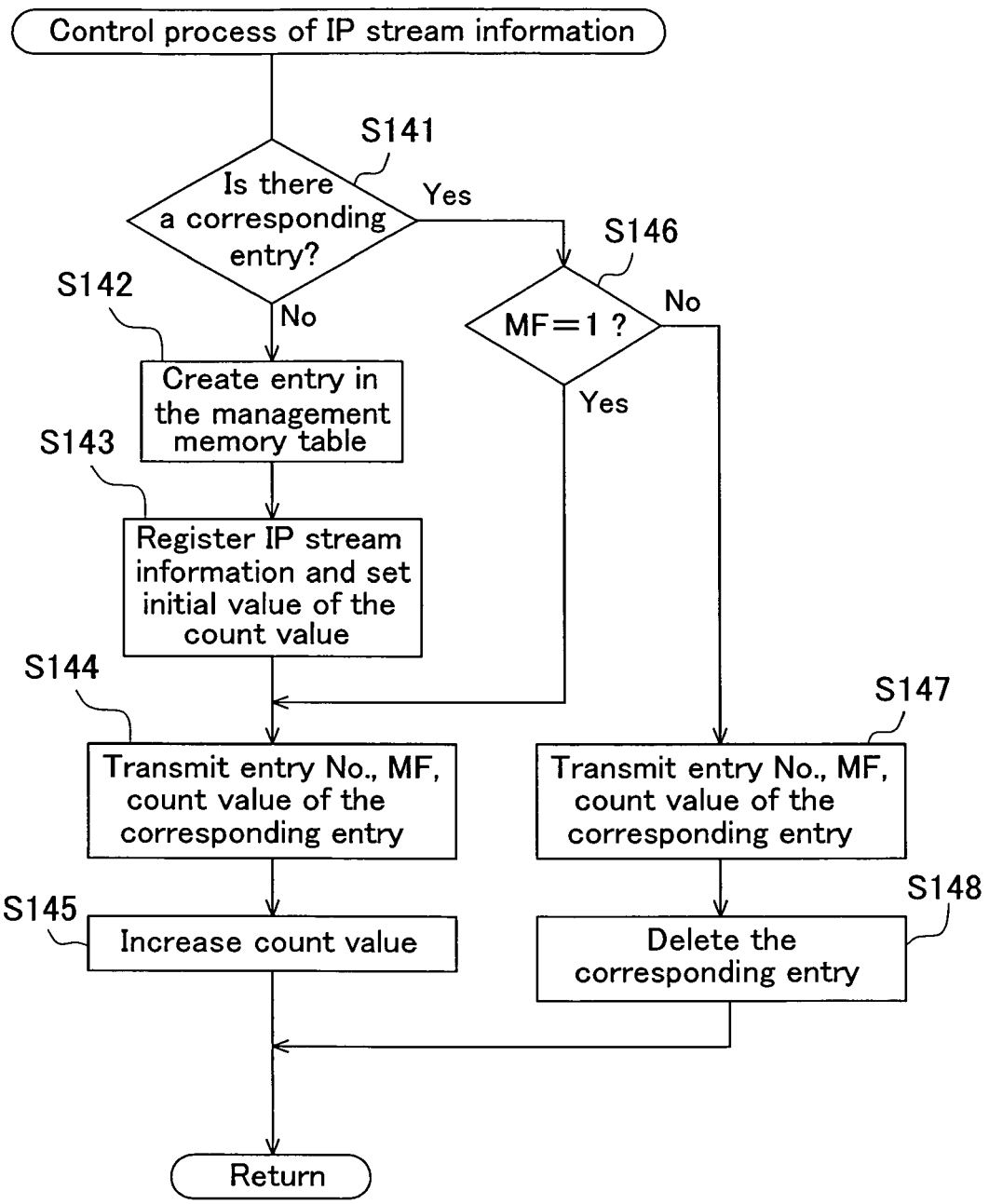
FIG. 9 is a flow chart illustrating the details of the control process of the IP stream information in FIG. 6.

Next, the control process of Step S14 will be described in detail with reference to FIG. 9.

When at the stage for executing the control process of Step S14, the data manager 303 first checks if the entry (corresponding entry) that stores the transferring information in the IP stream information received from the determiner 302 exists in the management memory table 3031 (Step S141). If, as a result, the entry does not exist (No in S141), the data manager 303 creates a new entry in the management memory table 3031 (Step S142).

The data manager 303 then registers the received IP stream information in each of the fields ("sender IP address", "destination IP address", "ID", and "MF") of the entry, and sets by writing the initial value of the counter (for example, 0) in the "count value" field of the entry (Step S143).

Next, the data manager 303 transmits (any of, and one or more of) the entry number, MF, and the count value of the corresponding entry in response to a request from the payload extractor 304 or the frame assembler 305 (Step S144).

Next, the data manger 303 increases the count value of the created entry (Step S145). In this embodiment, the data manger 303 increases the count value by "1" (refer to "count value=0→1" in the case of the frame f1 illustrated in FIG. 7).

In Step S141, if the entry exists (Yes in S141), the data manger 303 checks (Step S146) if the MF of the received IP stream information is "1" (an IP packet in the midst of the others). If the MF is "1" (Yes in S146: refer to "MF=1" in the case of each of the frames f2 to f6 illustrated in FIG. 7), the data manager 303 proceeds to Step S144, and in response to a request from the payload extractor 304 or the frame assembler 305, transmits (any of, and one or more of) the entry number, MF, and the count value of the corresponding entry. The data manager 303 then increases the transmitted count value by "1" (S145: refer to "count value" in the case of each of the frames f2 to f6 illustrated in FIG. 7).

If the MF is "0" (the last IP packet) (No in S146: refer to "MF=0" in the case of the frame f7 illustrated in FIG. 7), the data manager 303 proceeds to Step S147, and in response to a request from the payload extractor 304 or the frame assembler 305, transmits the entry number, MF, and the count value of the corresponding entry. The data manager 303 then deletes the corresponding entry from the management memory table 3031 (Step S148).

[Extracting Process of a Payload]

Figure 10:
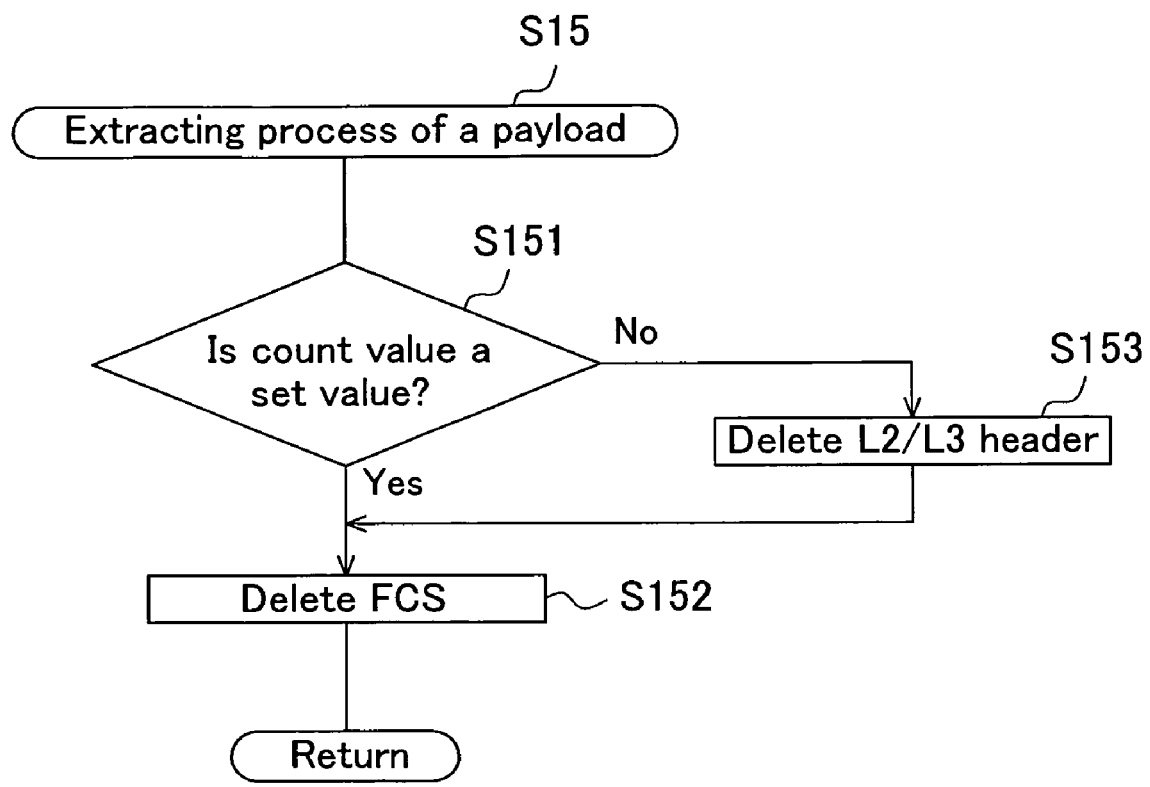
FIG. 10 is a flow chart illustrating the details of the extracting process of a payload in FIG. 6.

Next, the extracting process of Step S15 in FIG. 6 will be described in detail with reference to FIG. 10.

When at the stage of executing the extracting process of Step S15, the payload extractor 304 first checks (Step S151) if the count value corresponding to the transferring information inside the frame received from the determiner 302 is a set value N (for instance, N=5n: n=0, 1, 2, 3 . . . ). In that case, the payload extractor 304 requests the data manager 303 to search for the count value, with the transferring information inside the frame received from the determiner 302 as the key. As a result, the payload extractor 304 receives the count value from the data manager 303 that received the request.

If the count value is a set value N (Yes in S151), the payload extractor 304 deletes the FCS of the frame received (Step S152: refer to each of the payloads p1 and p6 under the section "When Extracting Payloads" illustrated in FIG. 7). If the count value is not the set value N (No in S151), the payload extractor 304 deletes the L2 header information and the L3 header information of the frame received (Step S153), and deletes the FCS of the frame received (Step S152: refer to each of the payloads p2 to p5, and p7, under the section "When Extracting Payloads" illustrated in FIG. 7). By doing so, the number of payloads with L2 header and L3 header added becomes less than the combined number of payloads.

In addition, in this embodiment, the case of the payload extractor 304 extracting the payload with L2 header and L3 header added from the determined frame, in the case that the count value in the management memory table 3031 is a set value (for instance, N=5n : n=0, 1, 2 . . . ) was described. However, the following kind of a process may be performed, and the L2 header and L3 header of the frame to be extracted may be deleted. That is, the payload extractor 304 deletes the L2 header and L3 header of a frame to be extracted only when {(count value) mod (maximum combined number of payloads)}≧1 is met. Furthermore, "mod" is the residue function. In this embodiment, the maximum combined number of payloads is, for instance, 5. Even by doing so, the number of payloads with L2 header and L3 header added becomes less.

[Process of Assembling a Combined Frame]

Figure 11:
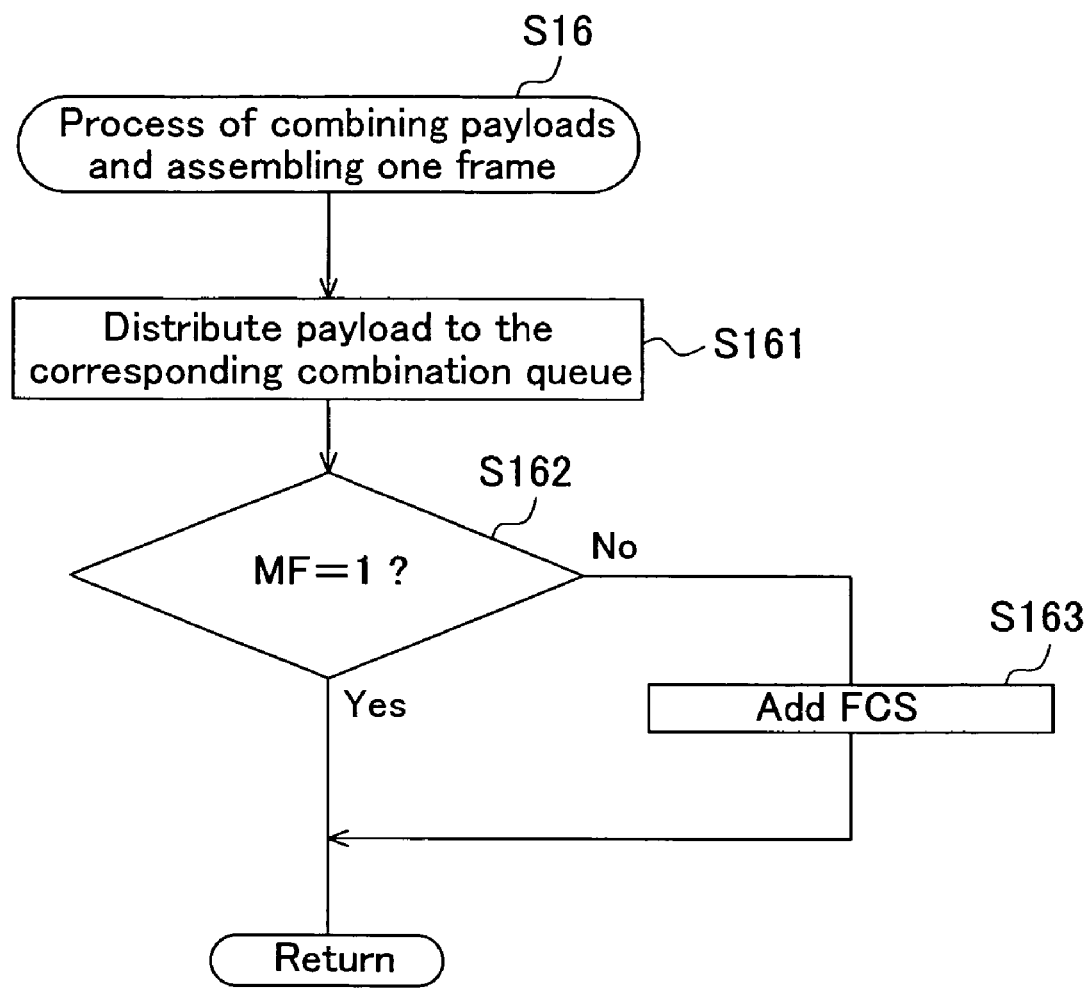
FIG. 11 is a flow chart illustrating the details of the process of assembling a frame in FIG. 6.

Next, the assembling process of Step S16 in FIG. 6 will be described in detail with reference to FIG. 11.

When at the stage of executing the assembling process of Step S16, the distributor 3051 of the frame assembler 305 distributes (Step S161) a payload to the combination queue 3052a that is provided corresponding to the payload received from the payload extractor 304. In that case, first, the distributor 3051 requests the data manager 303 to search for the entry number, with the transferring information received from the payload extractor 304 as the key. The distributor 3051 then receives the entry number from the data manager 303 that received the request. Next, the distributor 3051 passes the payload to the combination queue 3052a that is provided corresponding to the entry number (payload). The payload from the distributor 3051 is accumulated in the combination queue 3052a.

Next, the payload combiner 3652 checks (Step S162) if the MF corresponding to the payload received from the distributor 3051 is "1" (an IP packet in the midst of the others). In that case, the payload combiner 3052 requests the data manager 303 to search for the corresponding entry number and the MF, with the transferring information received from the distributor 3051 as the key. The payload combiner 3052 then receives the entry number and the MF from the data manager 303 for the request.

If the MF is "1" (an IP packet in the midst of the others) (Yes in S162), the step proceeds to Step S17. On the other hand, if the MF is "0" (the last IP packet) (No in S162), the FCS adder 3053 receives the plurality of payloads accumulated and combined at the combination queues 3052a, and adds the FCS (Step S163: refer to each of the combined frames f11 and f12 under the section "When Transmitting Frames" illustrated in FIG. 7).

As described above, according to the embodiment 1, the L2 relay unit 30 transfers one combined frame with a plurality of payloads extracted from a plurality of frames combined, when transferring (transmitting) to the network N31, which is the transferring destination, having an MTU (for example, 9000 bytes) that is greater than the network N21 or N22 on the receiving side. Therefore, the number of frames transferred to the network N31, which is the transferring destination, is less than the number of frames from the network N21 or N22 of the receiving side. Consequently, the overall burden on the network N31, which is the transferring destination, is reduced, and it is possible to improve the transferring efficiency of frames.

In addition, according to the embodiment 1, the L2 relay unit 30 fragmentizes a combined frame and transfers a plurality of the original frames when transferring (transmitting) to the network N21 or N22, which is the transferring destination having an MTU (for example, 1500 bytes) that is less than the network N31 that is on the receiving side. As a result, a plurality of the original frames is transferred in response to the MTU of the network N21 or N22, which is the transferring destination. Therefore, a stabilized operation of the entire network may be carried out, and it is possible to contribute to the controlling of the number of frames on the network N31 on the receiving side. Consequently, the transferring efficiency of frames of the entire network may be improved.

WORKING EXAMPLE

Here, the calculation result of the bandwidth compression ratio in the case of the L2 relay unit 30 assembling the combined frames f11 and f12 illustrated in FIG. 7 by the procedure of the assembling process of a frame in FIG. 6 described above is described below. The entire frame length of the seven frames f1 through f7 (refer to FIG. 7) becomes 10794 bytes, and the entire frame length of the two combined frames f11 and f12 (refer to FIG. 7) becomes 10484 bytes. In that case, the bandwidth compression ratio in the case that the combined frames are assembled is (10794 bytes−10484 bytes)/10794 bytes=approximately 0.0287=approximately 2.87%. Consequently, this means that the transferring efficiency of frames is improved. In addition, in the case that the bandwidth (rate of data transfer) of the network is 8 Gbps, a bandwidth of approximately 230 Mbps becomes available.

The items included in the above described 10794 bytes (entire frame length of the seven frames) and the 10484 bytes (entire length of the two combined frames) are as follows.

[Entire Frame Length of the Seven Frames]

Entire frame length: 10794 bytes (which is 7 frames×1542 bytes/i frame)

(Item included in the 1542 bytes: one frame)

Gap between L2 packets: 12 bytes

L2 preamble: 8 bytes

L2 header (VLAN tag single stage): 18 bytes

L3 header (no Option): 20 bytes

Payload: 1480 bytes

FCS: 4 bytes

[Entire Frame Length of the Two Combined Frames]

Entire frame length: 10484 bytes (which is 7462 bytes+3022 bytes)

(Items included in the 7462 bytes: the combined frame f11)

Gap between L2 packets: 12 bytes

L2 preamble: 8 bytes

L2 header (VLAN tag single stage): 18 bytes

L3 header (no Option): 20 bytes

Payloads: 7400 bytes (which is 5 (five) payloads×1480/1 payload)

FCS: 4 bytes (Items included in the 3022 bytes: the combined frame f12)

Gap between L2 packets: 12 bytes

L2 preamble: 8 bytes

L2 header (VLAN tag single stage): 18 bytes

L3 header (no Option): 20 bytes

Payloads: 2960 bytes (which is 2 payloads×1480 bytes/1 payload)

FCS: 4 bytes

[Restoring Process Procedure of a Frame]

Next, the procedure of the restoring process of frames in the L2 relay unit 30 will be described with reference to FIGS. 12 and 13.

Figure 12:
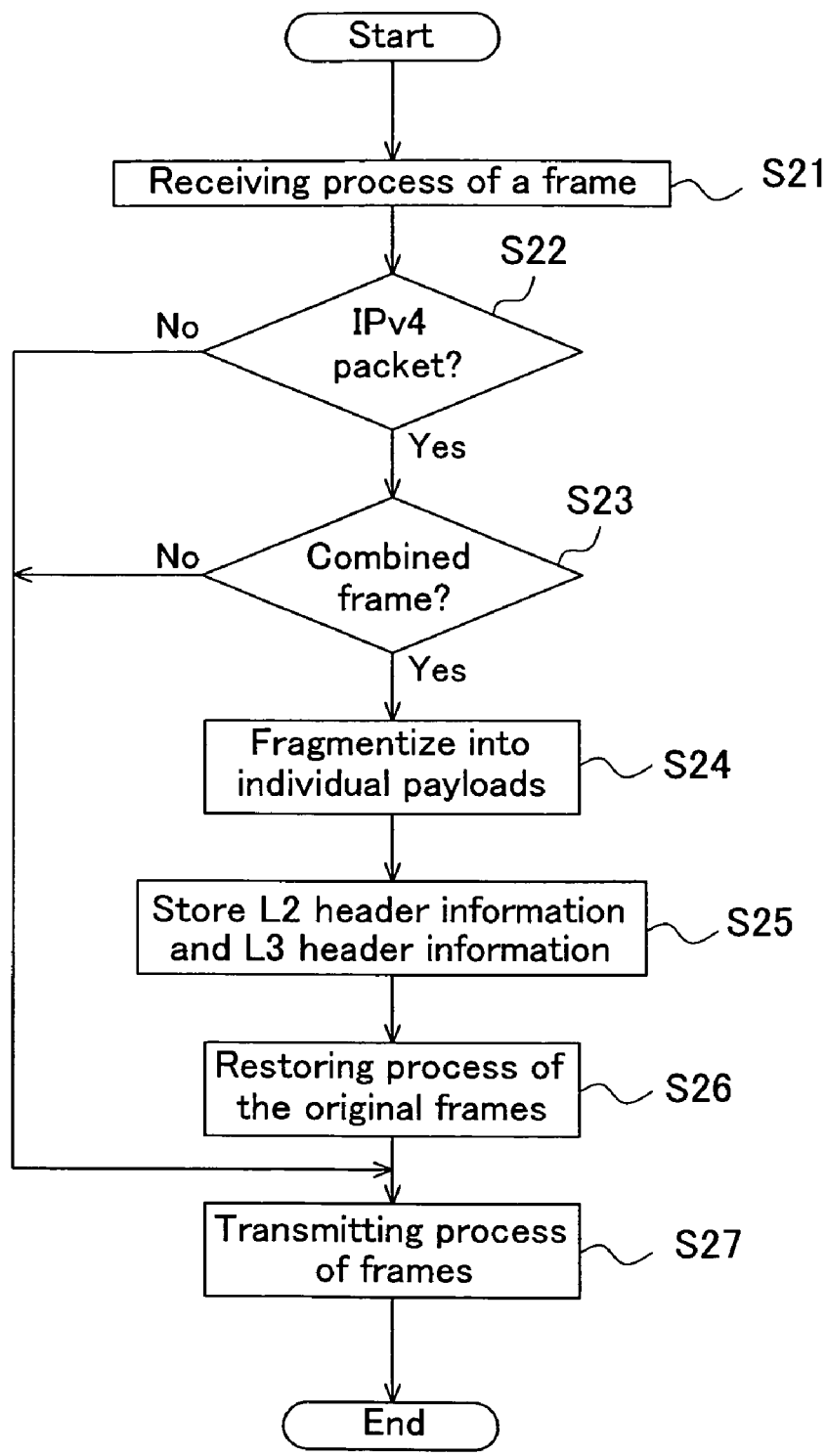
FIG. 12 is a flow chart illustrating the overall restoring process of frames in the L2 relay unit in FIG. 1.

FIG. 12 is a flow chart illustrating the overall restoring process of frames in the L2 relay unit. In this embodiment, the L2 relay unit 30 used for performing the restoring process procedure is the one having the configuration illustrated in FIG. 5.

The multiplexer 311 receives frames via the network N31, and performs the receiving process of frames, of multiplexing the received frames (Step S21). In this receiving process, the multiplexer 311 receives, for example, two combined frames f11 and f12 illustrated in FIG. 13. Each of the combined frames f11 and f12 are the same as each of the combined frames f11 and f12 in FIG. 7 that are assembled by the procedure of the assembling process of frames.

Next, the determiner 312 determines (Step S22) whether if the IP packet of the frame is an IPv4 packet, from the Version (refer to FIG. 3) inside the frame with the receiving process performed. If the IP packet is not an IPv4 packet (No in S22), the multiplexer 316 performs the transmitting process (Step S27) of the frame received from the determiner 312 via the transmitter 317. Through this transmitting process, the frame is transmitted to the network S21 or N22, which is the transferring destination.

If the IP packet is an IPv4 packet (Yes in S22), based on the frame with the receiving process performed, the determiner 312 determines whether if the frame is a combined frame (Step S23). In that case, the determiner 312 checks whether or not the entire frame length of the object of determination is longer than a fixed length (which is 1500 bytes+22 bytes). If the entire frame length is shorter than the fixed length, the determiner 312 determines that the frame is not a combined frame (No in S23), and the transmitter 317 receives the frame that is received from the determiner 312 via the multiplexer 316, and transmits the frame to the network N21 or N22, which is the transferring destination (Step S27).

If the entire frame length is longer than the fixed length, the determiner 312 determines that the frame is a combined frame (Yes in S23), and the fragmentizer 313 fragmentizes the payloads into individual payloads from the frame determined to be a combined frame (Step S24). For example, in the case of the combined frame f11 illustrated in FIG. 13, the fragmentizer 313 fragmentizes payloads into each of the payloads p1 through p5 from the combined frame f11. In addition, in the case of the combined frame f12 illustrated in FIG. 13, the fragmentizer 313 fragmentizes payloads into each of the payloads p6 and p7 from the combined frame f12.

Next, based on the L2 header information and the L3 header information of the combined payloads, the fragmentizer 313 sets the L2 header information and the L3 header information corresponding to each fragmentized payload. In that case, the fragmentizer 313 resets only a portion (MF, fragment offset, checksum) of the L3 header information, based on each payload. If the MF inside the combined frame is "0" (the last IP packet) and a fragmentized payload is positioned to the last of the combined frame, the MF is set to "0" (the last IP packet). Other than that, the MF is set (refer to "MF=0" of frame f7 illustrated in FIG. 13) to "1" (an IP packet in the midst of the others). The fragment offset is a value which the starting positions of the payloads are sequentially added from "0" (refer to fragment offset of each of the frames f1 through f7 under the section "When Transmitting the Original Frames" illustrated in FIG. 13). The checksum is recalculated. The memory 314 that received the L2 header information and the L3 header information from the fragmentizer 313 stores the L2 header information and the L3 header information (Step S25). The memory 314 stores the L2 header information and the L3 header information sequentially in the fragmentized order of the fragmentized payloads.

Next, based on the L2 header information and the L3 header information received from the memory 314, the frame restorer 315 reconstructs each payload received from the fragmentizer 313 so as to fulfill the MTU of the network N21 or N22, which is the transferring destination, and performs the restoring process of restoring each frame to the frame prior to being combined (Step S26: refer to each of the frames f1 through f7 under the section "When Transmitting the Original Frames" in FIG. 13).

More specifically, first, the L3 header adder 3151 of the frame restorer 315 adds each of the L3 header information received from the memory 314 to each payload received from the fragmentizer 313. In that case, the L3 header adder 3151 sequentially adds each of the L3 header information to each of the payloads in the fragmentized order of each payload.

Next, the L2 header adder 3152 adds each of the L2 header information received from the memory 314 to each of the payloads received from the L3 header adder 3151. In that case, the L2 header adder 3152 sequentially adds each of the L2 header information to each of the payloads in the fragmentized order of each of the payloads.

Next, the FCS adder 3153 calculates the FCS for a frame including a payload that is received from the L2 header adder 3152, and sets the FCS in the FCS field of the frame. This frame becomes the same as that of the original frame.

When the multiplexer 316 receives the frame from the determiner 312 or the FCS adder 3153, the multiplexer 316 multiplexes the received frame and passes it to the transmitter 317, where the transmitter 317 performs the transmitting process (Step S27) of transmitting the frame to the network N21 or N22, which is the transferring destination.

Through the above kind of a restoring process, each original frame, with the combined frame fragmentized and reconstructed, is transmitted to the network N21 or N22, which is the transferring destination. Therefore, this contributes to the controlling of the number of frames on the network N31 where combined frames are transmitted. Consequently, the transferring efficiency of frames of the entire network may be improved.

[Embodiment 2]

In the case that an in-channel monitoring frame is connected, the in-channel monitoring frame and frames including payloads are mixed, and possibly the transferring efficiency of frames including payloads may be deteriorated. Consequently, in embodiment 2, whether if there is connectivity of an in-channel monitoring frame is being monitored, and the assembling process of frames is performed for a predetermined amount of time when the in-channel monitoring frame is connected. The L2 relay unit used in embodiment 2 has a configuration illustrated in FIGS. 14 and 15, instead of the configuration illustrated in FIGS. 2 and 5. Other configurations are the same as the configuration in FIG. 1.

[Example of the Configuration of the L2 Relay Unit in the Case of Performing an Assembling Process of Frarhes]

An example of the configuration of an L2 relay unit 30A in the case of performing an assembling process of frames will be described with reference to FIG. 14.

Figure 14:
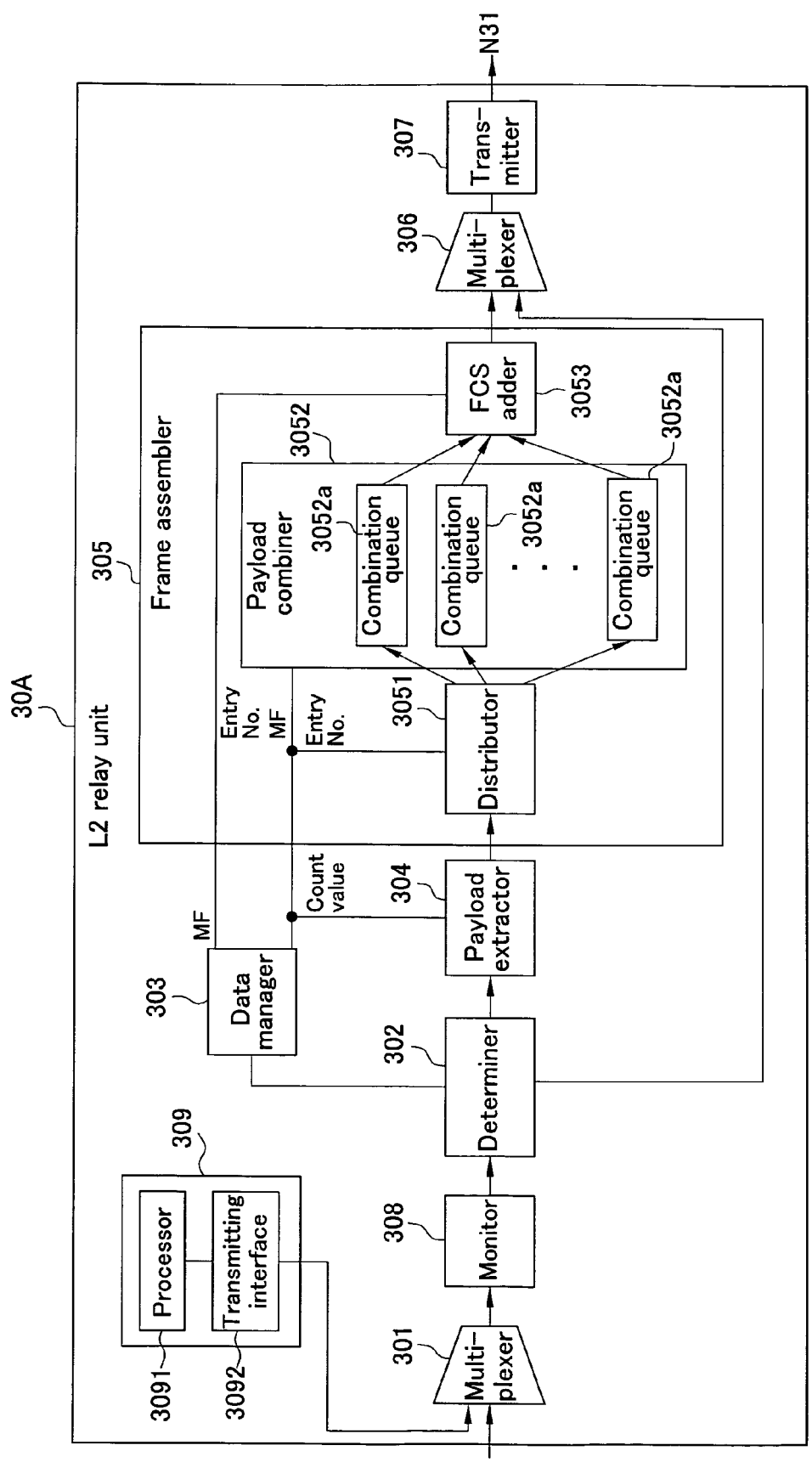
FIG. 14 is a diagram illustrating an example of the configuration of an L2 relay unit in the case of performing the assembling process of a frame in embodiment 2.

FIG. 14 is a diagram illustrating an example of the configuration of the L2 relay unit in embodiment 2. In addition, in embodiment 2, portions having the same functions as that of embodiment 1 are given the same numerals, and repeated descriptions will be omitted.

The L2 relay unit 30A in FIG. 14 is configured to further include a monitor 308 and an in-channel control device (hereinafter, referred to as control device) 309, from the L2 relay unit 30 in embodiment 1 in FIG. 2. In this embodiment, even though the monitor 308 and the control device 309 are described to be configured by hardware (logic circuit), for instance, they may be implemented by using a program. In other words, they may be implemented by a processor executing according to a program that is stored in the memory and read out by the processor.

The monitor 308 monitors whether if there is connectivity of an in-channel monitoring frame, from the frames received from the multiplexer 301. In that case, the monitor 308 checks whether or not the VID (inside the VLAN tag) of a frame is a specified identifier. The specified identifier may be just one or may be more than one.

In the case that the VID is a specified identifier, the monitor 308 confirms the connectivity of an in-channel monitor frame (that is, determines that the frame from the multiplexer 301 is an in-channel monitoring frame), and outputs an activation signal to the determiner 302. The determiner 302 that received the activation signal activates for a predetermined amount of time (for instance, one minute), and performs the determining process of Steps S12 and S13 in FIG. 6 described above. In that case, the L2 relay unit 30A performs the same operation as the assembling process procedure in FIG. 6 described above.

In addition, if the monitor 308 is not able to confirm about the connectivity of the next in-channel monitoring frame, during the time from the point of time (a predetermined time) that the connectivity of an in-channel monitoring frame is confirmed until a predetermined amount of time (for example, 1 minute) passes, the monitor 308 outputs a stop signal to the determiner 302. The determiner 302 that received the stop signal does not perform the determining process of Steps S12 and S13 in FIG. 6 described above. In that case, when the determiner 302 receives a frame from the monitor 308, the determiner 302 only passes the frame to the multiplexer 306. The multiplexer 306 that received the frame performs the transmitting process of Step S17 in FIG. 6.

In addition, in this embodiment, if the determiner 302 received the stop signal, the determiner 302 instructs the data manager 303 to delete all entries in the management memory table 3031. The data manager 303 that received the instruction deletes all entries in the management memory table 3031.

The control device 309 includes a processor 3091, such as a microprocessor, and a transmitting interface 3092. The processor 3091 generates the in-channel monitoring frame and transmits the in-channel monitoring frame to the multiplexer 301 via the transmitting interface 3092.

[An Example of the Configuration of the L2 Relay Unit in the Case of Performing a Restoring Process of Frames]

Figure 15:
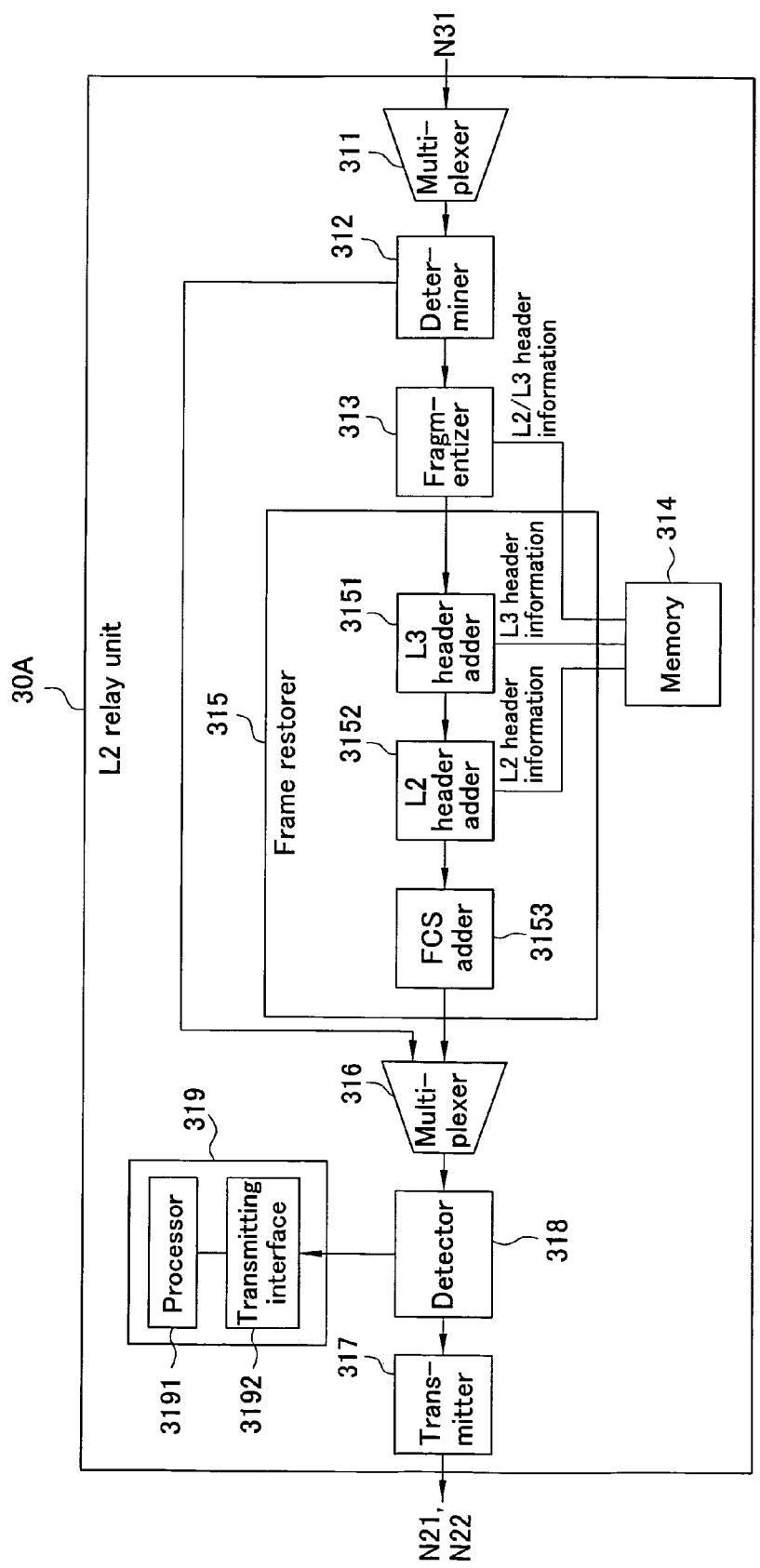
FIG. 15 is a diagram illustrating an example of the configuration of an L2 relay unit in the case of performing the restoring process of frames in embodiment 2.

An example of the configuration of the L2 relay unit 30A in the case of performing a restoring process of frames will be described with reference to FIG. 15. FIG. 15 is a diagram illustrating an example of the configuration of the L2 relay unit in the embodiment 2. In addition, in embodiment 2, portions having the same functions as that of the embodiment 1 are given the same numerals, and repeated descriptions will be omitted.

The L2 relay unit 30A in FIG. 15 is configured to further include a detector 318 and a control device 319, from the L2 relay unit 30 in the embodiment 1 in FIG. 5. In this embodiment, even though the detector 318 and the control device 319 are described to be configured by hardware (logic circuit), they may be implemented by a program.

The detector 318 detects whether or not a frame from the multiplexer 316 is an in-channel monitoring frame. In that case, the detector 318 checks whether or not the VID (inside the VLAN tag) inside the frame is a specified identifier. If the VID is such an identifier, the detector 318 determines that the frame is an in-channel monitoring frame, and passes the frame to the control device 319. The control device 319 that received the in-channel monitoring frame performs a monitoring process based on the identifier specified in the VID inside the in-channel monitoring frame.

According to embodiment 2, the L2 relay unit 30A performs the assembling process of frames from Steps S12 to S17 in FIG. 6 for a predetermined amount of time after the connectivity of an in-channel monitoring frame is confirmed. For this reason, a predetermined number of each of the frames including payloads is combined and one combined frame is transferred to the network N31, and the transferring efficiency of frames of the entire network N31 improves. Therefore, it becomes easy to improve the transferring efficiency of frames, even if an in-channel monitoring frame is connected.

[Another Example of Configuration]

Here, in the above described embodiments 1 and 2, in the L2 relay unit, as a method for associating payloads with the original data, the data manager 303 that stores the count value and the IP stream information inside a frame was used. However, it is not limited to this.

For example, instead of the data manager 303, as a method for associating payloads with the original data, a frame buffer (not illustrated in the figures) that accumulates frames may be used. In that case, when the determiner 302 determines that a frame includes a payload, the determiner 302 passes the frame to the frame buffer. The frame buffer accumulates frames received from the determiner 302 up to an area limit (or a certain number).

The payload extractor 304 refers to the IP stream information (including the fragment offset) inside the frames accumulated in the frame buffer, and extracts a predetermined number (fulfilling the maximum combined number of payloads of the combined frame) of the payloads of the frames that belong to the same original data, in the fragmentized order (determined by the fragment offset), and passes the payloads to the frame assembler 305. One of each of the L2 header and the L3 header is added to the predetermined number of payloads that is passed to the frame assembler 305. The distributor 3051 of the frame assembler 305 that received the predetermined number of payloads combines by distributing the predetermined number of payloads to the same combination queue 3052a. The FCS adder 3053 receives the combined payloads from the combination queue 3052a, and resets the FCS, MF, and the fragment offset. The frame after being reset becomes a combined frame. Even with this kind of a configuration, the same effects as that of both the embodiments 1 and 2 may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A frame relay apparatus, comprising:
    a receiver to receive a plurality of frames via a first network;
    a determiner to determine whether or not each of the received frames includes a payload that is set by fragmentizing an original data;
    a payload extractor to extract the payloads from the frames to associate with the original data when said determiner determines that the frames include said payloads;
    a frame assembler to assemble one frame by combining the extracted payloads for every associated original data; and
    a transmitter to transmit the assembled frame to a second network,
    a data manager to refer to a frame every time a frame is determined to include said payload by said determiner, count the number of determinations for every original data associated with the payload, and manage the counted number,
    wherein said payload extractor adds a frame header and a packet header of the frame determined to the payload to be extracted, based on the counted number managed by said data manager,
    wherein said payload extractor extracts the payload with said added frame header and said added packet header as the first payload of said one frame to be assembled when the counted number managed by said data manager is a predetermined number, and extracts only the payload from the determined frame as a subsequent payload of said one frame to be assembled when said counted number is a number other than the predetermined number, and
    said frame assembler assembles said one frame by combining the extracted first payload and the subsequent payload.

2. The frame relay apparatus according to claim 1, further comprising
    a monitor to monitor whether there is connectivity of a monitoring frame from each of the received frames,
    wherein said determiner determines whether the received frames include said payloads during a predetermined period of time after the connectivity of the monitoring frame is confirmed by said monitor.

3. The frame relay apparatus according to claim 1, wherein said frame assembler includes:
    a distributor for distributing each extracted payload for every associated original data;
    a payload combiner for combining the distributed payloads for every associated original data; and
    a frame constructor for constructing one frame including the combined payloads.

4. The frame relay apparatus according to claim 1, wherein a maximum transfer unit of the second network is greater than that of the first network,
    wherein the payload extractor extracts the payload from each of a predetermined consecutive number of the received frames, the predetermined number being preset such that a size of the frame assembled by the frame assembler is less than the maximum transfer unit of the second network.

5. A frame relay method, comprising:

receiving a plurality of frames via a first network;

determining whether or not each of the received frames includes a payload that is set by fragmentizing an original data;

extracting each of the payloads from the frames to associate with the original data when it is determined that the frames include said payloads;

assembling one frame by combining the extracted payloads for every associated original data; and transmitting the assembled frame to a second network, referring to a frame every time a frame is determined to include said payload in said determining step, counting the number of determinations for every original data associated with the payload, and managing the counted number, wherein said extracting adds a frame header and a packet header of the determined frame to the payload to be extracted, based on the counted number, wherein said extracting extracts the payload with said added frame header and said added packet header as the first payload of said one frame to be assembled when the counted number is a predetermined number, and extracts only the payload from the determined frame as a subsequent payload of said one frame to be assembled when said counted number is a number other than the predetermined number, and said assembling assembles the one frame by combining the extracted first payload and the subsequent payload.

6. The frame relay method according to claim 5, wherein the first network is configured so that a monitoring frame is communicated therein, and said determining step is performed during a predetermined period of time after the received frame is found to be the monitoring frame.

7. The frame relay method according to claim 5, wherein said assembling includes:

distributing each extracted payload for every associated original data;

combining the distributed payloads for every associated original data; and constructing one frame including the combined payloads.

8. The frame relay apparatus according to claim 5, wherein a maximum transfer unit of the second network is greater than that of the first network, wherein the extracting includes an extraction of the payload from each of a predetermined consecutive number of the received frames, the predetermined number being preset such that a size of the frame assembled is less than the maximum transfer unit of the second network.

* * * * *